(12) United States Patent  
Kang et al.

(10) Patent No.: US 8,441,591 B2
(45) Date of Patent: May 14, 2013

(54) PIXEL ARRAY SUBSTRATE

(71) Applicant: Chunghwa Picture Tubes, Ltd., Taoyuan (TW)

(72) Inventors: Liang-Hao Kang, Taoyuan County (TW); Yang-Hui Chang, Hsinchu County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/662,539

(22) Filed: Oct. 28, 2012

(65) Prior Publication Data

US 2013/0056760 A1 Mar. 7, 2013

Related U.S. Application Data

(62) Division of application No. 12/352,575, filed on Jan. 12, 2009, now Pat. No. 8,330,884.

(30) Foreign Application Priority Data

Aug. 26, 2008 (TW) ............................... 97132574 A

(51) Int. Cl.
*G02F 1/1368* (2006.01)
(52) U.S. Cl.
USPC .................... 349/40; 349/38; 349/48; 349/50

(58) Field of Classification Search .................... 349/38, 349/40, 42, 48, 50; 257/355, 356; 345/91, 345/92; 361/56, 91.1, 91.5
See application file for complete search history.

(56) References Cited

U.S. PATENT DOCUMENTS 5,606,340 A * 2/1997 Suzuki et al. .................... 345/87
6,384,878 B1 * 5/2002 Kwak .............................. 349/40
2006/0221288 A1 * 10/2006 Ota et al. ...................... 349/143

FOREIGN PATENT DOCUMENTS

JP 09-090411 * 4/1997

* cited by examiner

*Primary Examiner* — Dung Nguyen
*Assistant Examiner* — Tai Duong
(74) *Attorney, Agent, or Firm* — Jianq Chyun IP Office

(57) ABSTRACT

A pixel array substrate includes a pixel region and a circuit region adjacent to the pixel region. A plurality of display pixel units are disposed in the pixel region and a plurality of dummy pixel units are disposed in the circuit region. Each of the dummy pixel units includes a data line, a scan line, a plurality of switching elements and a plurality of pixel electrodes. The switching elements are electrically connected to the scan line and data line. The pixel electrodes are electrically connected to the switching elements. Particularly, electrostatic currents in the pixel region can be dissipated by the dummy pixel units in the circuit region. The dummy pixel units preserve the continuity of electricity in the pixel array substrate and function as an inner short ring. Therefore, the area of the circuit region on the pixel array substrate is larger.

4 Claims, 11 Drawing Sheets

PIXEL ARRAY SUBSTRATE

CROSS-REFERENCE TO RELATED APPLICATION

This application is a divisional application of and claims the priority benefit of U.S. application Ser. No. 12/352,575, filed on Jan. 12, 2009, now allowed, which claims the priority benefit of Taiwan application serial no. 97132574, filed Aug. 26, 2008. The entirety of each of the above-mentioned patent applications is hereby incorporated by reference herein and made a part of specification.

BACKGROUND OF THE INVENTION

1. Field of the Invention

The present invention relates to a pixel array substrate, and particularly to wherein an area of a circuit region is larger.

2. Description of Related Art

In recent years, with the progressive manufacturing techniques in optoelectronic and semiconductor fields, flat panel displays are growing rapidly, wherein liquid crystal displays (LCDs) have become the mainstream due to its low operating voltage, no radiation, light weight and small volume.

A conventional LCD mainly includes an LCD panel and a back light module, wherein the LCD panel generally comprises a thin film transistor (TFT) pixel array substrate, a color filter (CF) substrate and a liquid crystal layer disposed therebetween. Intricate circuits and components such as scan lines, data lines and pixel units are formed on the TFT array substrate by semiconductor manufacturing processes.

FIG. 1 is a schematic diagram of a conventional pixel array substrate. Referring to FIG. 1, a pixel array substrate 100 comprises a substrate 110, a plurality of pixel units, and a plurality of scan lines SL and data lines DL. The substrate 110 comprises a pixel region 112 and a circuit region 114 adjacent to the pixel region 112. The scan lines SL and data lines DL are disposed in the pixel region 112 of the substrate 110. An end of each of the scan lines SL and an end of each of the data lines DL extend into the circuit region 114, and are electrically connected to elements in a gate driving circuit area 132 and a source driving circuit area 142. Each of the pixel units comprises a TFT 122 and a pixel electrode 124, and each pixel unit is electrically connected to its corresponding scan line SL and data line DL. In addition, pixel units 120a disposed in the pixel region 112 have graphic-displaying functions, so they are called display pixel units, whereas pixel units 120b disposed in the circuit region 114 are called dummy pixel units due to the fact that they cannot display graphics.

Many electrostatic charges may be accumulated during the manufacturing process of the aforementioned pixel array substrate 100, especially when manufacturing equipment and operators touch the pixel array substrate 100 frequently. Therefore, when the electrostatic charges on the pixel array substrate 100 are accumulated to a critical amount, an electrostatic discharging phenomenon would occur.

When an electrostatic discharging phenomenon occurs, important circuits or elements on the pixel array substrate 100 may be easily damaged. Particularly, electrostatic charges accumulate easily on the ends of the scan lines SL and the data lines DL, making them especially prone to point discharging. The instantaneous high voltage from point discharging often causes short circuits in the scan lines SL and the data lines DL, leading to malfunction of the pixel array substrate 100.

In the prior art, in order to avoid the damages caused by the electrostatic discharging, it is common to dispose a shorting bar 150 in the circuit region 114 of the pixel array substrate 100. The shorting bar 150 is serially connected to gate lines and source lines through a plurality of switching elements 152. When the lines or pixel units 120a, 120b on the substrate 110 are overloaded with electrostatic charges, the switching elements 152 can be turned on to dissipate the electrostatic charges to the shorting bars 150, in order to avoid electrostatic discharging. However, this method requires more space for a circuit layout of circuit region 114.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

SUMMARY OF THE INVENTION

Figure 1:
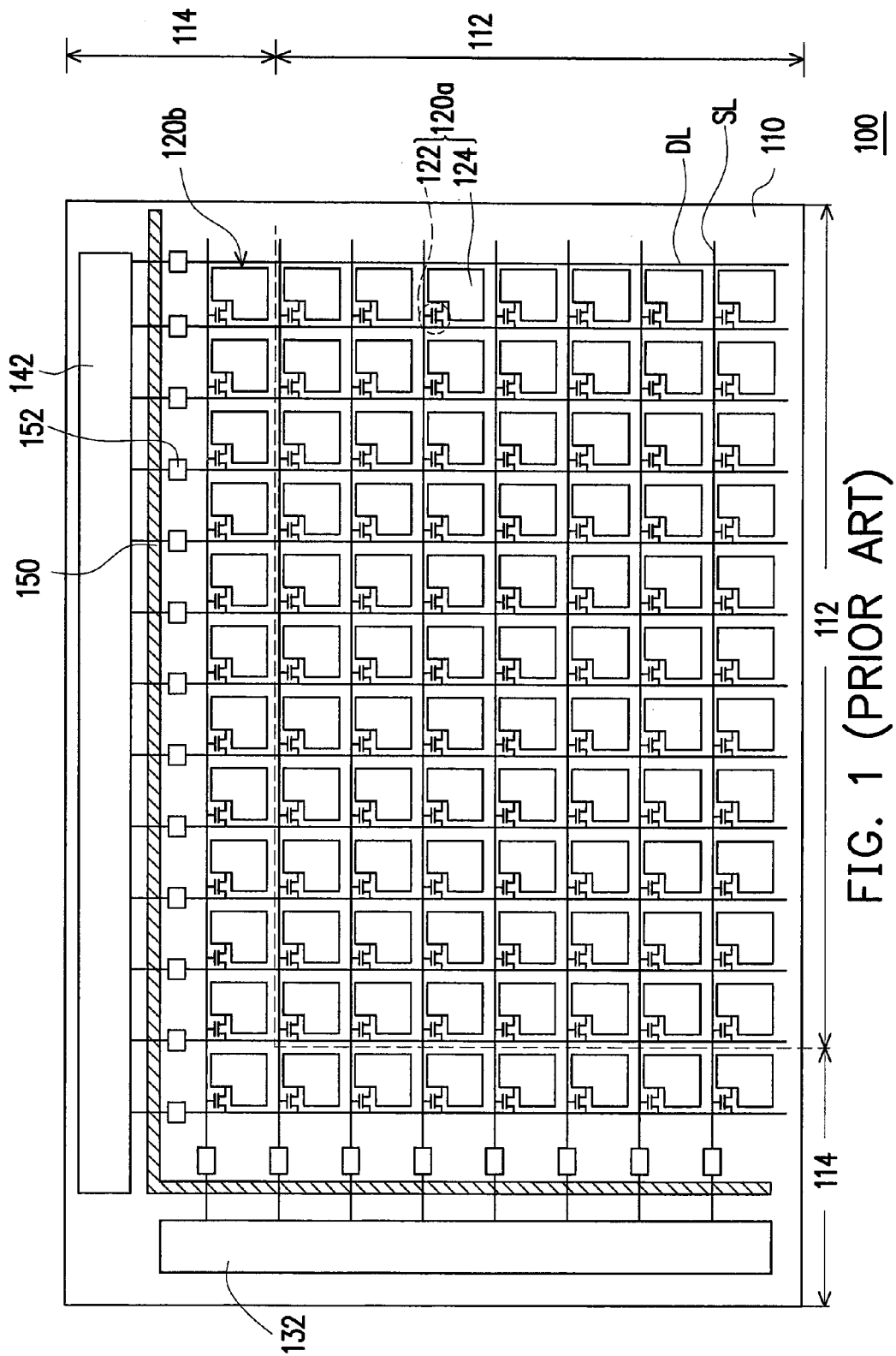
FIG. 1 is a schematic diagram of a conventional pixel array substrate.

The present invention provides a pixel array substrate that requires less space for the circuit region.

The present invention provides a pixel array substrate, which comprises a pixel region and a circuit region adjacent to the pixel region. The pixel array substrate comprises a plurality of display pixel units disposed in the pixel region and a plurality of dummy pixel units disposed in the circuit region. Each of the dummy pixel units comprises a data line, a scan line, a plurality of switching elements and a plurality of pixel electrodes. The switching elements are electrically connected to the scan lines and the data lines. The pixel electrodes are electrically connected to the switching elements. Particularly, electrostatic currents in the pixel region can be dissipated by the dummy pixel units in the circuit region.

According to an embodiment of the present invention, each of the aforementioned dummy pixel units comprises a first switching element, a second switching element, a first pixel electrode, a third switching element, a fourth switching element and a second pixel electrode. An end of the first switching element is electrically connected to the data line, while the other end of the first switching element is electrically connected to one end of the second switching element. The other end of the second switching element is electrically connected to the scan line. The first pixel electrode is electrically connected to the first and second the switching elements. One end of the third switching element is electrically connected to the data line, while the other end of the third switching element is electrically connected to one end of the fourth switching element, and the other end of the fourth switching element is electrically connected to the scan line. The second pixel electrode is electrically connected to the third and the fourth switching elements.

According to an embodiment of the present invention, the aforementioned first, second, third and fourth switching elements are all diodes.

According to an embodiment of the present invention, the aforementioned first, second, third and fourth switching elements are all TFTs, and the gates of the TFTs are electrically connected to the sources or drains of the same TFT.

According to an embodiment of the present invention, each of the aforementioned dummy pixel units further comprises a first storage capacitor and a second storage capacitor. The first storage capacitor is electrically connected to the first and the second switching elements, and the second storage capacitor is electrically connected to the third and the fourth switching elements.

According to an embodiment of the present invention, each of the aforementioned dummy pixel units comprises a common line, a first switching element, a second switching element, a first pixel electrode, a third switching element, a fourth switching element and a second pixel electrode. The common line is disposed parallel to the scan line, and an end of the first switching element is electrically connected to the corresponding data line or scan line. The other end of the first switching element is electrically connected to one end of the second switching element, and the other end of the second switching element is electrically connected to the common line. The first pixel electrode is electrically connected to the first and the second switching elements, and an end of the third switching element is electrically connected to the data line. The other end of the third switching element is electrically connected to one end of the fourth switching element, and the other end of the fourth switching element is electrically connected to the common line. The second pixel electrode is electrically connected to the third and fourth switching elements.

According to an embodiment of the present invention, the aforementioned first, second, third and fourth switching elements are all diodes.

According to an embodiment of the present invention, the aforementioned first, second, third and fourth switching elements are all TFTs, and the gates the TFTs are electrically connected to the sources or drains of the same TFT.

According to an embodiment of the present invention, each of the aforementioned dummy pixel units further comprises a first storage capacitor and a second storage capacitor. The first storage capacitor is electrically connected to the first and the second switching elements, and the second storage capacitor is electrically connected to the third and the fourth switching elements.

According to an embodiment of the present invention, each of the aforementioned dummy pixel units comprises a TFT, a pixel electrode, a common line, a first switching element, a second switching element, a third switching element and a fourth switching element. The TFT is electrically connected to the data line and the scan line. The pixel electrode is electrically connected to the TFT. The common line is disposed parallel to the scan line. One end of the first switching element is electrically connected to the data line, while the other end of the first switching element is electrically connected to one end of the second switching element, and the other end of the second switching element is electrically connected to the common line. One end of the third switching element is electrically connected to the other end of the second switching element and the common line. The other end of the third switching element is electrically connected to one end of the fourth switching element, and the other end of the fourth switching element is electrically connected to the other end of the first switching element and the data line.

According to an embodiment of the present invention, the aforementioned first, second, third and fourth switching electrodes are all diodes.

According to an embodiment of the present invention, the aforementioned first, second, third and fourth switching elements are all TFTs, and the gates of the TFTs are electrically connected to the sources or drains of the same TFT.

According to an embodiment of the present invention, each of the aforementioned dummy pixel units further comprises a first storage capacitor electrically connected to the TFT.

According to an embodiment of the present invention, each of the aforementioned dummy pixel units further comprises a second storage capacitor and a third storage capacitor. The second storage capacitor is electrically connected to the second and the third switching elements, and the third storage capacitor is electrically connected to the first and the fourth switching elements.

According to an embodiment of the present invention, each aforementioned dummy pixel unit comprises a TFT, a first pixel electrode, a first switching element, a second switching element, a third switching element, a fourth switching element a and second pixel electrode. The TFT is electrically connected to the data line and scan line. The first pixel electrode is electrically connected to the TFT. One end of the first switching element is electrically connected to the scan line, while the other end of the first switching element is electrically connected to one end of the second switching element. The other end of the second switching element is electrically connected to the data line. One end of the third switching element is electrically connected to the other end of the second switching element. The other end of the third switching element is electrically connected to one end of the fourth switching element, and the other end of the fourth switching element is electrically connected to the scan line. The second pixel electrode is electrically connected to the third and the fourth switching elements.

According to an embodiment of the present invention, the aforementioned first, second, third and fourth switching elements are all diodes.

According to an embodiment of the present invention, the aforementioned first, second, third and fourth switching elements are all TFTs, and the gates of the TFTs are electrically connected to the sources or drains of the TFTs.

According to an embodiment of the present invention, each of the aforementioned dummy pixel units further comprises a first storage capacitor electrically connected to the TFT.

According to an embodiment of the present invention, each aforementioned dummy pixel units further comprises a second storage capacitor and a third storage capacitor. The second storage capacitor is electrically connected to the second and the third switching elements, and the third storage capacitor is electrically connected to the third and the fourth switching elements.

In the pixel array substrate of the present invention, the dummy pixel unit further has the function of providing protection against electrostatic discharging.

Therefore an additional electrostatic discharging protection element in the circuit region is not required. This increases flexibility in the circuit layout of the circuit region.

In order to make the aforementioned and other objects, features and advantages of the present invention more comprehensible, several embodiments accompanied with figures are described in detail below.

DESCRIPTION OF EMBODIMENTS

First Embodiment

Figure 2:
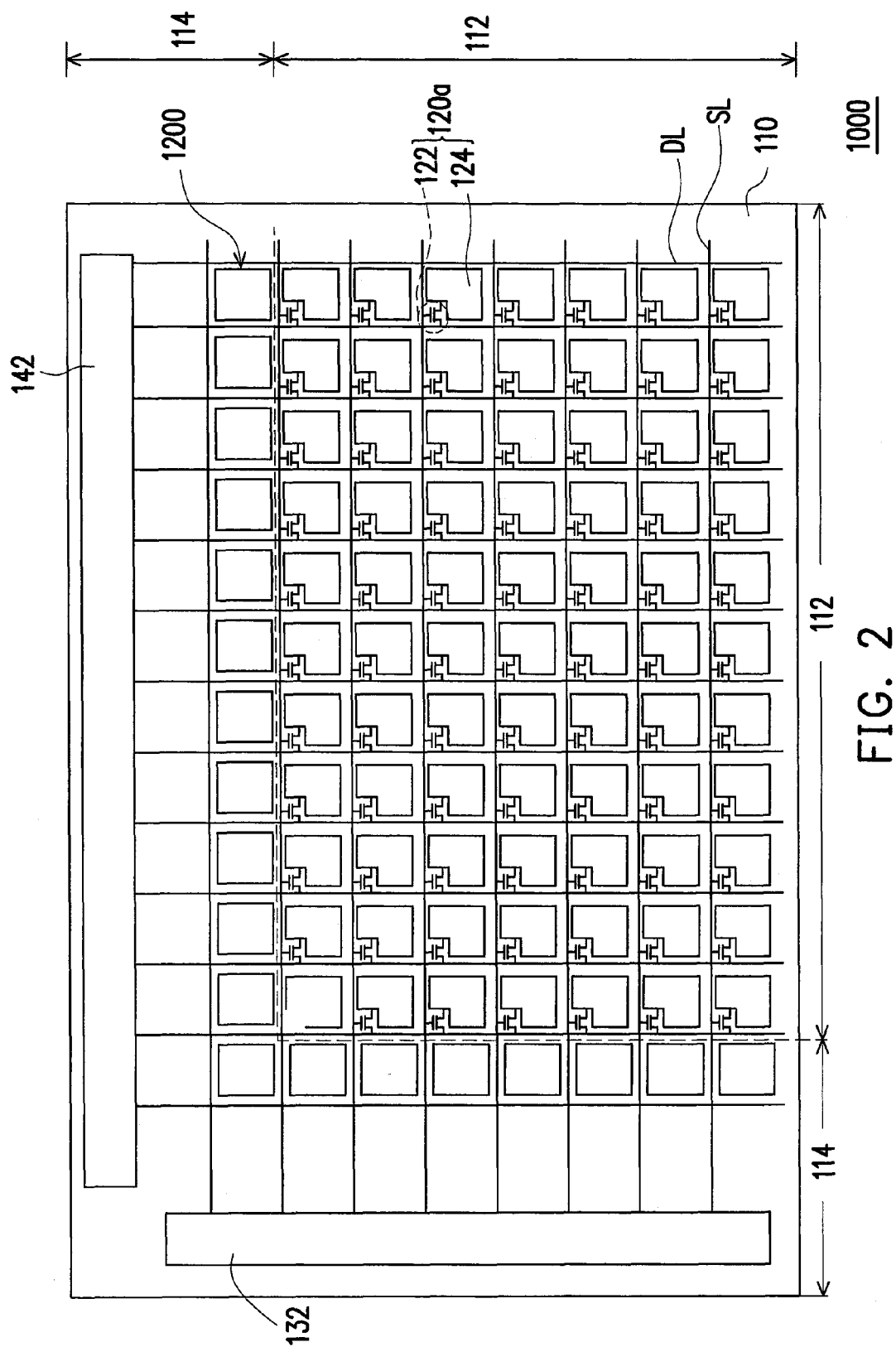
FIG. 2 is a schematic diagram of a pixel array substrate according to the first embodiment of the present invention.

FIG. 2 is a schematic diagram of a pixel array substrate according to the first embodiment of the present invention. Referring to FIG. 2, a pixel array substrate 1000 comprises a substrate 110, a plurality of scan lines SL and data lines DL, a plurality of display pixel units 120a and a plurality of dummy pixel units 1200. The substrate 110 comprises a pixel region 112 and a circuit region 114 adjacent to the pixel region 112. The scan lines SL and data lines DL are disposed in the pixel region 112 of the substrate 110. An end of each of the scan lines SL and an end of each of the data lines DL extend into the circuit region 114, and are electrically connected to elements of a gate driving circuit region 132 and a source driving circuit region 142. Each of the display pixel units 120a comprises a TFT 122 and a pixel electrode 124, and each of the display pixel units is electrically connected to the corresponding scan line SL and the corresponding data line DL.

In addition, the pixel array substrate 1000 further comprises a plurality of dummy pixel units 1200. The dummy pixel units 1200 are disposed on at least one edge of an area where the display pixel units 120a are located. More specifically, the aforementioned dummy pixel units 1200 may be disposed in the area between the display pixel units 120a and the gate driving circuit area 132, in the area between the display pixel unit 120a and the source driving circuit area 142, or in both areas.

In the present invention, the dummy pixel units may be implemented in a plurality of ways. Details are illustrated below.

Figure 3:
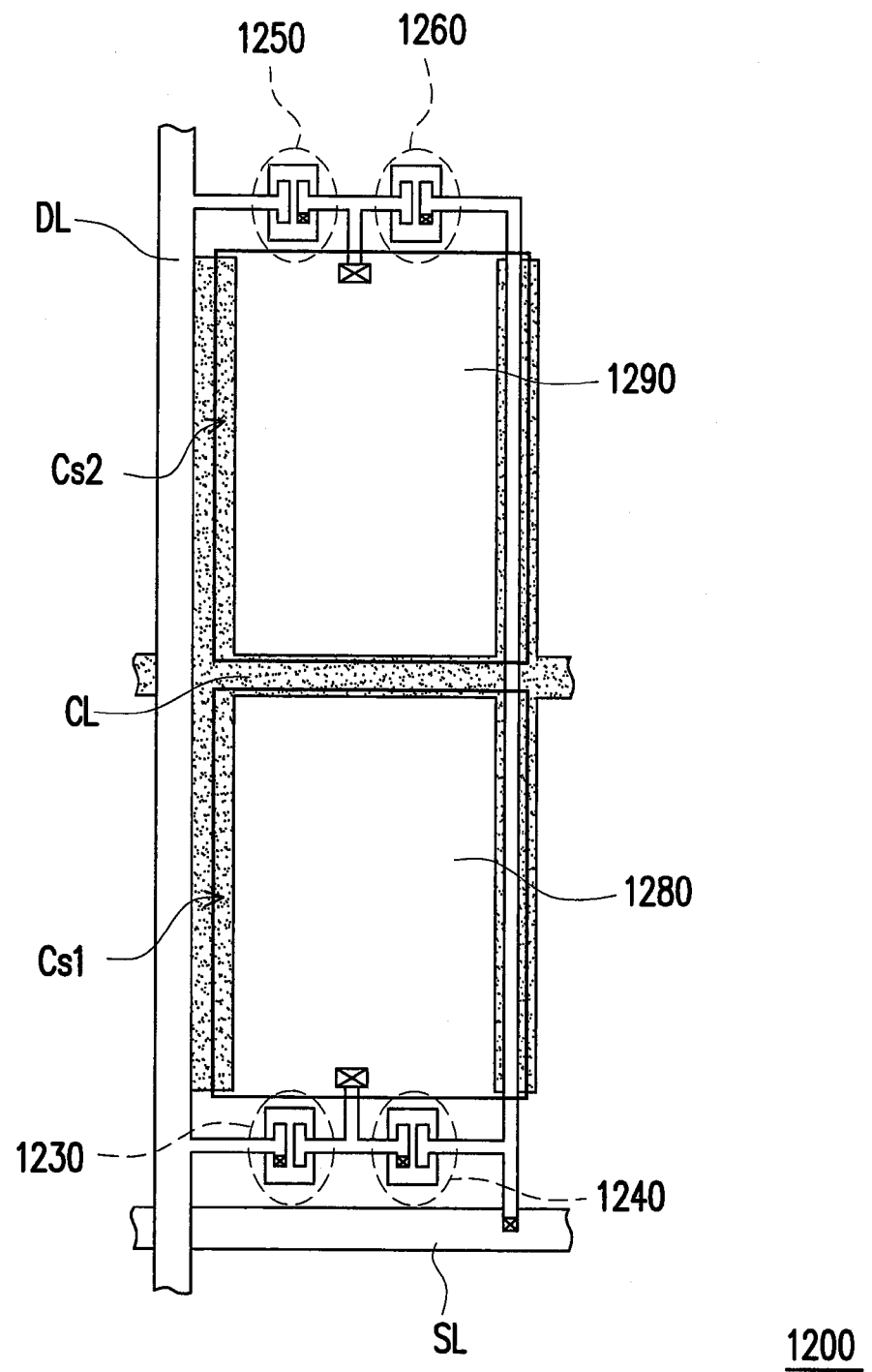
FIG. 3 is a schematic diagram of a single dummy pixel unit of the pixel array substrate in FIG. 2.
Figure 4A:
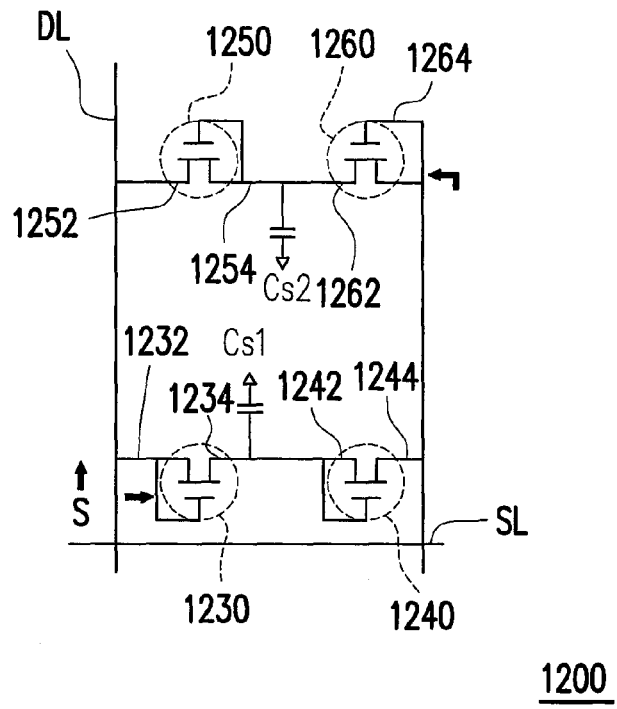
FIG. 4A is a schematic diagram of an equivalent circuit of the single dummy pixel unit in FIG. 3.

FIG. 3 is a schematic diagram of a single dummy pixel unit of the pixel array substrate in FIG. 2. FIG. 4A is a schematic diagram of an equivalent circuit of the single dummy pixel unit in FIG. 3. Referring to both FIGS. 3 and 4A, each of the dummy pixel units 1200 comprises a data line DL, a scan line SL, a first switching element 1230, a second switching element 1240, a first pixel electrode 1280, a third switching element 1250, a fourth switching element 1260 and a second pixel electrode 1290.

Accordingly, an end 1232 of the first switching element 1230 is electrically connected to the data line DL, while the other end 1234 of the first switching element 1230 is electrically connected to one end 1242 of the second switching element 1240. The other end 1244 of the second switching element 1240 is electrically connected to the scan line SL. In addition, the first pixel electrode 1280 is electrically connected to the first switching element 1230 and the second switching element 1240.

Accordingly, one end 1252 of the third switching element 1250 is electrically connected to the data line DL, while the other end 1254 of the third switching element 1250 is electrically connected to one end 1262 of the fourth switching element 1260, and the other end 1264 of the fourth switching element 1260 is electrically connected to the scan line SL. In addition, the second pixel electrode 1290 is electrically connected to the third switching element 1250 and the fourth switching element 1260.

According to the present embodiment, the first switching element 1230, the second switching element 1240, the third switching element 1250 and the fourth switching element 1260 are all TFTs, and the gates of the TFTs are electrically connected to the sources or drains of the same TFT. In other embodiments, the first switching element 1230, the second switching element 1240, the third switching element 1250 and the fourth device electrode 1260 may also all be diodes or other switching elements.

In addition, each of the dummy pixel units 1200 further comprises a first storage capacitor $Cs_1$ and a second storage capacitor $Cs_2$. The first storage capacitor $Cs_1$ is electrically connected to the first switching element 1230 and the second switching element 1240, while the second storage capacitor $Cs_2$ is electrically connected to the third switching element 1250 and the fourth switching element 1260. The first storage capacitor $Cs_1$ and the second storage capacitor $Cs_2$ are formed by stacking parts of a common line CL, the first pixel electrode 1280 and the second pixel electrode 1290 in one of the dummy pixel units 1200, respectively. In the present embodiment, the common line CL is shaped as an H, but the present invention is not limited to the said arrangement; other shapes may also be used. In addition, the first storage capacitor $Cs_1$ and the second storage capacitor $Cs_2$ may also be formed by stacking a pixel electrode and a scan line (not shown), which is so called a capacitor on gate (Cst on gate).

By utilizing the aforementioned first switching element 1230, the second switching element 1240, the third switching element 1250 and the fourth switching element 1260 of the dummy pixel unit 1200, a plurality of inner short rings (ISRs) may be formed. The ISRs can effectively dissipate electrostatic discharges and protect the pixel array substrate 1000.

In detail, when the electrostatic current S is transmitted from the data line DL, the first switching element 1230 and the second switching element 1240 will be turned on, so that the electrostatic current S passes through the first switching element 1230 and the second switching element 1240, and is dissipated from the scan line SL after being transmitted from one end 1244 of the second switching element 1240. Therefore, the data line DL, the first switching element 1230, the second switching element 1240 and the scan line SL form an ISR that effectively dissipates the electrostatic current S. It is noted that the first storage capacitor $Cs_1$ which is electrically connected to the first switching element 1230 and the second switching element 1240 may provide additional storage capacity for electrostatic charges, thereby increasing the efficacy of dissipating electrostatic charges.

In addition, a portion of the electrostatic current S may also pass through the end 1244 of the second switching element 1240 to the fourth switching element 1260 and the third switching element 1250, and later being transmitted to the data line DL and dissipated. Therefore, the data line DL, the first switching element 1230, the second switching element 1240, the fourth switching element 1260 and the third switching element 1250 may form another ISR to dissipate electrostatic current S. Likewise, by utilizing the second storage capacitor $Cs_2$ which is electrically connected to the fourth switching element 1260 and the third switching element 1250, additional storage capacity for electrostatic charges is obtained, thereby increasing the efficacy of dissipating electrostatic current.

Figure 4B:
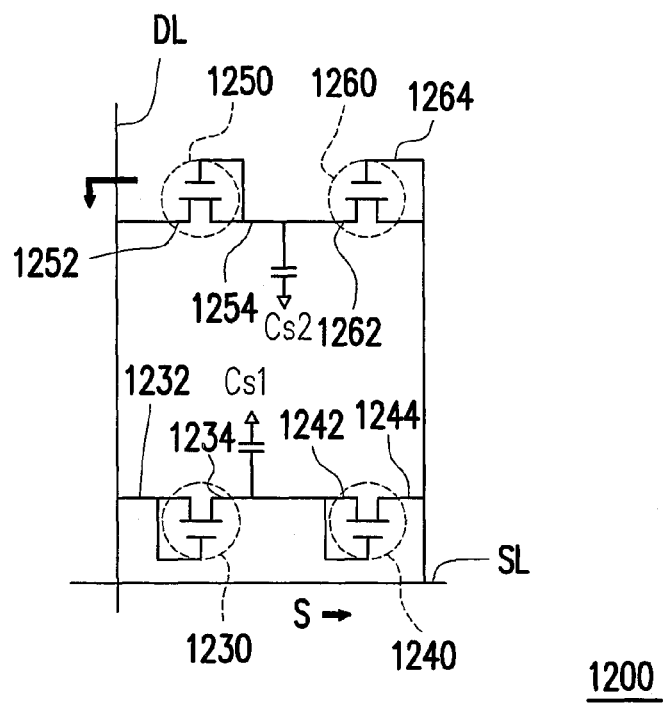
FIG. 4B is a schematic diagram of an electrostatic discharging path when static electricity is transmitted from a scan line.

FIG. 4B is a schematic diagram of an electrostatic discharging path when static electricity is transmitted from a scan line. According to FIG. 4B, when electrostatic current S is transmitted from the end of the scan line SL, the fourth switching element 1260 and the third switching element 1250 will be turned on, and the electrostatic current S will be transmitted to the data line DL from one end 1252 of the third switching element 1250 and will be dissipated. In addition, the second storage capacitor $Cs_2$ also stores a portion of the electrostatic charges, thereby increasing the efficacy of dissipating electrostatic current.

In addition, the electrostatic current S transmitted to the data line DL may also be further transmitted to the first switching element 1230 and the second switching element 1240, where it passes through the end 1244 of the second switching element 1240 to the scan line SL and be dissipated.

Accordingly, a plurality of ISRs formed by the first switching element 1230, the second switching element 1240, the third switching element 1250 and the fourth switching element 1260 of the dummy pixel unit 1200 effectively dissipates electrostatic current and protects the pixel array substrate 1000. Particularly, because the dummy pixel unit 1200 also has the same function as the ISR, an additional ISR is not required to be disposed in the circuit region on the pixel array substrate 1000. This decreases the wiring area of the circuit region on the pixel array substrate 1000.

It is noted that when an opposite substrate and the pixel array substrate 1000 are assembled to form an LCD panel, the first pixel electrode 1280 and the second pixel electrode 1290 of the dummy pixel unit 1200 on the pixel array substrate 1000 will respectively form a first liquid crystal storage capacitor and a second liquid crystal storage capacitor (not shown) with pixel electrodes on the opposite substrate. The present embodiment should be comprehensible to those of ordinary skills in the present art.

Second Embodiment

The present embodiment is approximately identical to the first embodiment, and same or similar reference numerals used in the present embodiment and in the first embodiment represent the same or similar elements. Here in the present embodiment a display pixel unit and a dummy pixel unit 2200 on a pixel array substrate are disposed in approximately the same ways as in the first embodiment, so a relevant description is omitted.

Figure 5A:
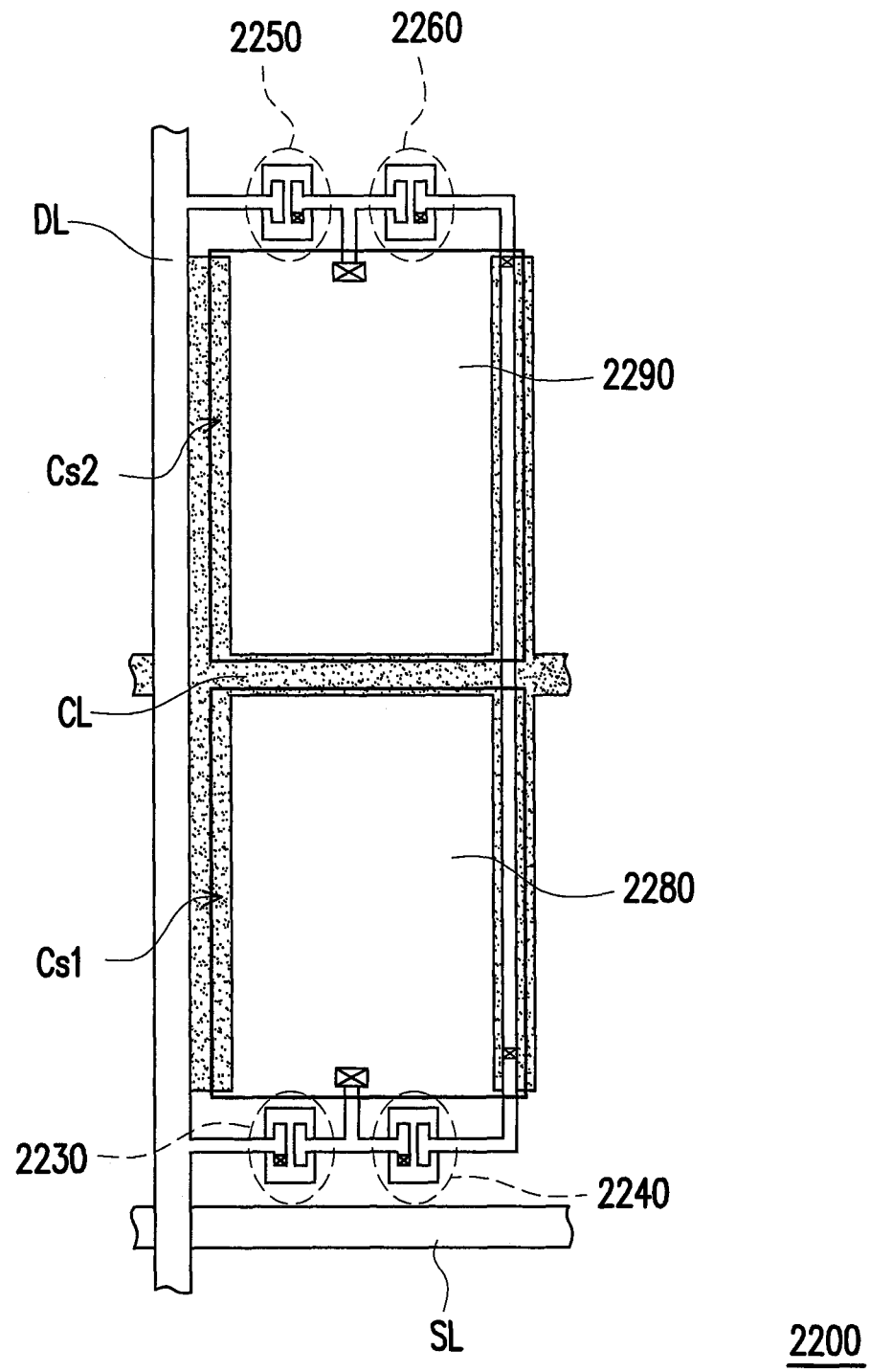
FIG. 5A is a schematic diagram of a single dummy pixel unit of a pixel array substrate according to the second embodiment of the present invention.
Figure 5B:
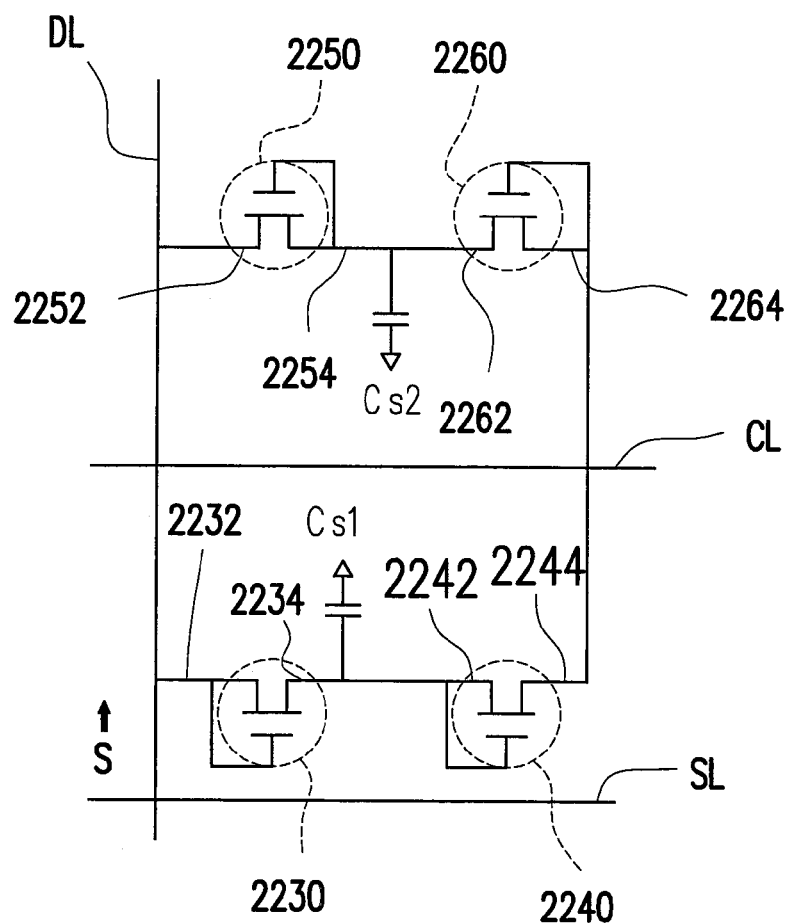
FIG. 5B is a schematic diagram of an equivalent circuit of the single dummy pixel unit in FIG. 5A.

FIG. 5A is a schematic diagram of a single dummy pixel unit of a pixel array substrate according to the second embodiment of the present invention. FIG. 5B is a schematic diagram of an equivalent circuit of the single dummy pixel unit in FIG. 5A. Referring to both FIGS. 5A and 5B, each of the dummy pixel units 2200 of the present embodiment comprises a data line DL, a scan line SL, a first switching element 2230, a second switching element 2240, a first pixel electrode 2280, a third switching element 2250, a fourth switching element 2260, a second pixel electrode 2290 and a common line CL.

According to the present embodiment, the common line CL is disposed parallel to the scan line SL, and an end 2232 of the first switching element 2230 is electrically connected to the data line DL, whereas the other end 2234 of the first switching element 2230 is electrically connected to one end 2242 of the second switching element 2240. The other end 2244 of the second switching element 2240 is electrically connected to the common line CL. In addition, the first switching element 2230 and the second switching element 2240 are electrically connected to the first pixel electrode 2280. A corresponding stacking area of the first pixel electrode 2280 and the common line CL forms a first storage capacitor $Cs_1$, and the first storage capacitor $Cs_1$ is electrically connected to the first switching element 2230 and the second switching element 2240.

Accordingly, an end 2252 of the third switching element 2250 is electrically connected to the data line DL, while the other end 2254 of the third switching element 2250 is electrically connected to an end 2262 of the fourth switching element 2260. The other end 2264 of the fourth switching element 2260 is electrically connected to the common line CL. In addition, the third switching element 2250 and the fourth switching element 2260 are electrically connected to the second pixel electrode 2290. A corresponding stacking area of the second pixel electrode 2290 and the common line CL forms a second storage capacitor $Cs_2$, and the second storage capacitor $Cs_2$ is electrically connected to the third switching element 2250 and the fourth switching element 2260.

The data line DL, the first switching element 2230, the second switching element 2240, and the common line CL are electrically connected to form an ISR. In detail, when an electrostatic current S is transmitted from the data line DL, the first switching element 2230 and the second switching element 2240 will be turned on. The electrostatic current S may then be transmitted from the first switching element 2230 and the second switching element 2240 to the common line and be dissipated.

In addition, the first switching element 2230, the second switching element 2240, the third switching element 2250, the fourth switching element 2260 and the data line DL may also form an ISR to achieve the function of dissipating electrostatic current. In detail, a portion of the electrostatic current S may also be transmitted from the fourth switching element 2260 and the third switching element 2250 to the data line DL and be dissipated.

Similarly, the first storage capacitor $Cs_1$ and the second storage capacitor $Cs_2$ may store a portion of electrostatic charges, thereby increasing the efficacy of dissipating electrostatic currents.

Third Embodiment

The present embodiment is approximately identical to the second embodiment, and same or similar reference numerals used in the present embodiment and in the second embodiment represent the same or similar elements. A description of the same elements is therefore omitted.

Figure 6:
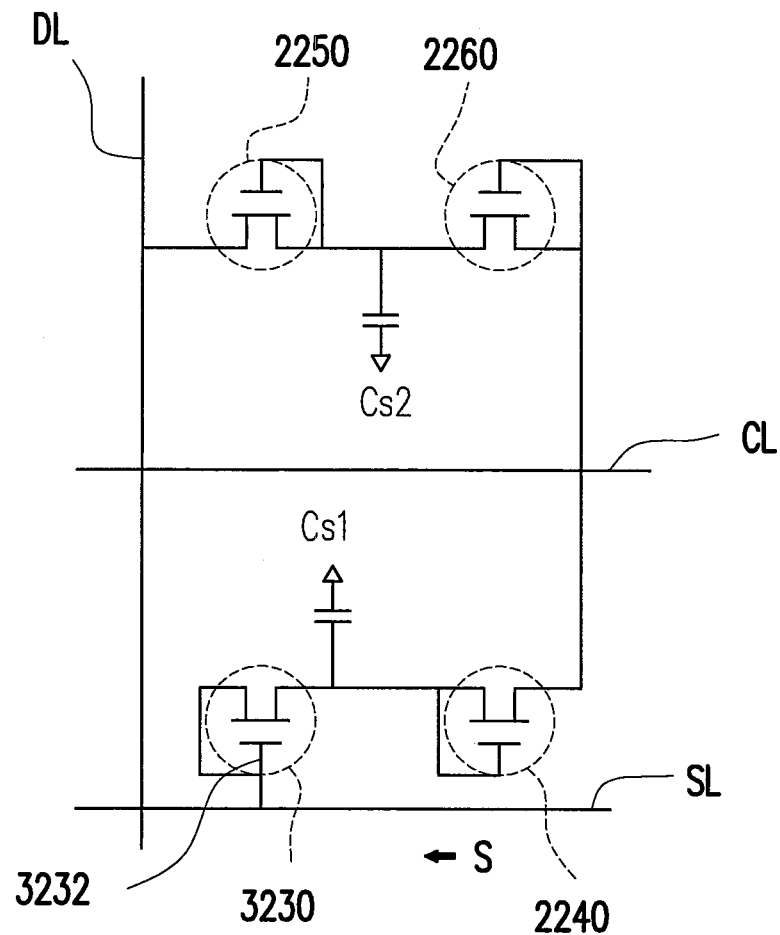
FIG. 6 is a schematic diagram of an equivalent circuit of a single dummy pixel unit in a pixel array substrate according to the third embodiment of the present invention.

FIG. 6 is a schematic diagram of an equivalent circuit of a single dummy pixel unit in a pixel array substrate according to the third embodiment of the present invention. Referring to FIG. 6, the difference between the present and second embodiment is that one end 3232 of a first switching element 3230 is connected to a scan line SL.

When an electrostatic current S is transmitted from the scan line SL, the electrostatic current S is transmitted through the first switching element 3230 and the second switching element 2240 to a common line CL and is dissipated. In addition, the electrostatic current S may also be transmitted from the fourth switching element 2260 and the third switching element 2250 to a data line DL and be dissipated.

Similarly, the first storage capacitor $Cs_1$ and a second storage capacitor $Cs_2$ may store a portion of electrostatic charges, thereby increasing the efficacy of dissipating electrostatic current.

Fourth Embodiment

Figure 7A:
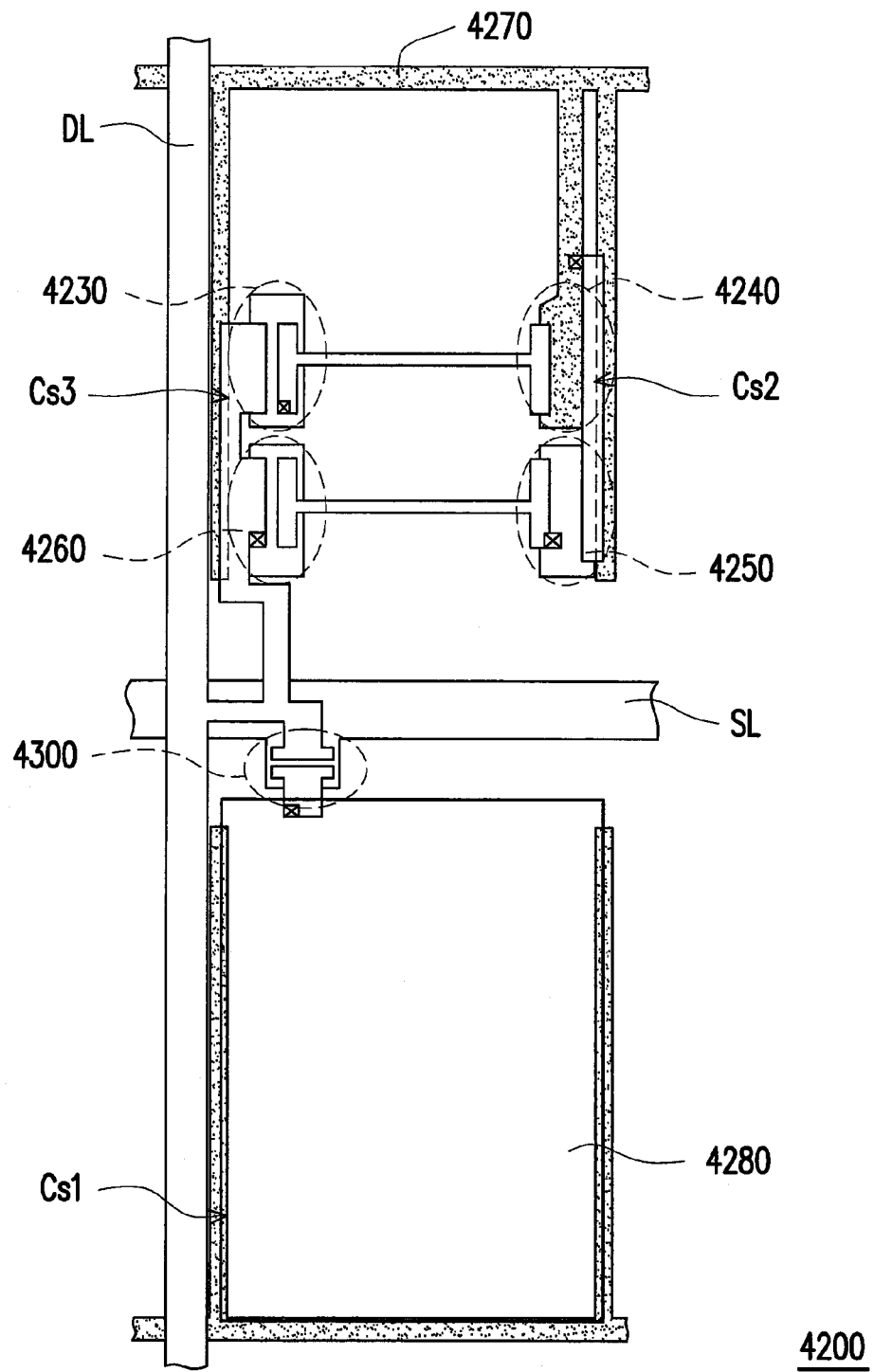
FIG. 7A is a schematic diagram of a single dummy pixel unit in the pixel array substrate according to the fourth embodiment of the present invention.
Figure 7B:
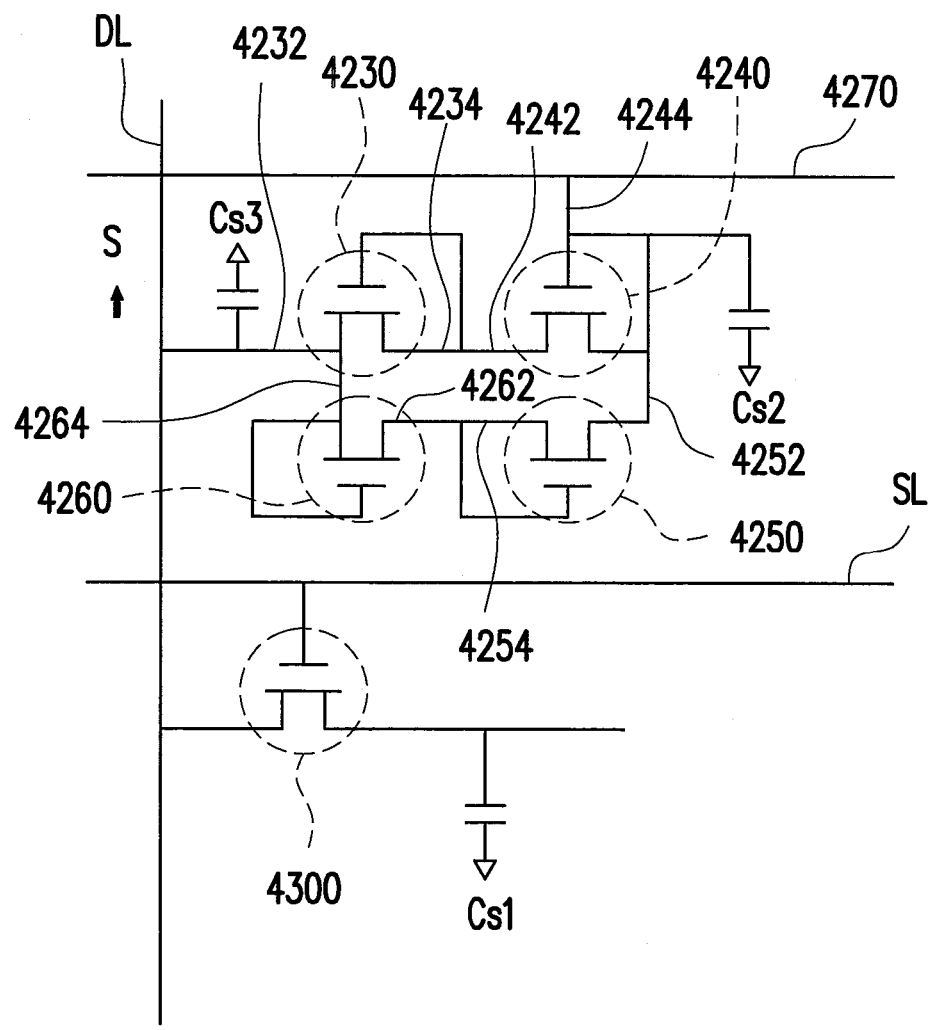
FIG. 7B is a schematic diagram of an equivalent circuit of the single dummy pixel unit in FIG. 7A.

FIG. 7A is a schematic diagram of a single dummy pixel unit in the pixel array substrate according to the fourth embodiment of the present invention. FIG. 7B is a schematic diagram of an equivalent circuit of the single dummy pixel unit in FIG. 7A. Referring to both FIGS. 7A and 7B, each of dummy pixel units 4200 of the present embodiment comprises a data line DL, a scan line SL, a first switching element 4230, a pixel electrode 4280, a second switching element 4240, a third switching element 4250, a fourth switching element 4260, a common line 4270 and a TFT 4300.

The TFT 4300 is electrically connected to the data line DL and scan line SL. The pixel electrode 4280 is electrically connected to the TFT 4300. The common line 4270 is disposed parallel to the scan line SL. One end 4232 of the first switching element 4230 is electrically connected to the data line DL, while the other end 4234 of the first switching element 4230 is electrically connected to an end 4242 of the second switching element 4240, and the other end 4244 of the second switching element 4240 is electrically connected to the common line 4270.

Accordingly, one end 4252 of the third switching element 4250 is electrically connected to the other end 4244 of the second switching element 4240 and the common line 4270. The other end 4254 of the third switching element 4250 is electrically connected to one end 4262 of the fourth switching element 4260, and the other end 4264 of the fourth switching element 4260 is electrically connected to the end 4232 of the first switching element 4230 and the data line DL.

Additionally, each of the dummy pixel units 4200 further comprises a first storage capacitor $Cs_1$ which is electrically connected to the TFT 4300. The first storage capacitor $Cs_1$ is formed by a stacking area of the pixel electrode 4280 and the common line 4270.

Furthermore, each of the dummy pixel units 4200 further comprises a second storage capacitor $Cs_2$ which is electrically connected to the second switching element 4240 and the third switching element 4250, and a third storage capacitor $Cs_3$ which is electrically connected to the first switching element 4230 and the fourth switching element 4260. The second storage capacitor $Cs_2$ and the third storage capacitor $Cs_3$ are formed by the respective overlapping areas between the common line 4270 and metal line of the second switching element 4240 or the third switching element 4250 and between the common line 4270 and the metal line of the first switching element 4230 or the fourth switching element 4260.

When electrostatic current S is transmitted from the data line DL, it is transmitted to the common line 4270 and be dissipated by turning on the fourth switching element 4260 and the third switching element 4250. In addition, the electrostatic current S transmitted by the common line 4270 may also be transmitted to the data line DL and be dissipated by turning on the second switching element 4240 and the first switching element 4230.

Moreover, the second storage capacitor $Cs_2$ and the third storage capacitor $Cs_3$ may provide extra storage capacity for electrostatic charges, thereby increasing the efficacy of dissipating electrostatic currents.

Note that in FIG. 7A, the design of the TFT 4300 and the pixel electrode 4280 located in the lower part of the dummy pixel 4200 is the same as that of the display pixel unit 1100. This achieves continuity of electronic characters.

Fifth Embodiment

Figure 8A:
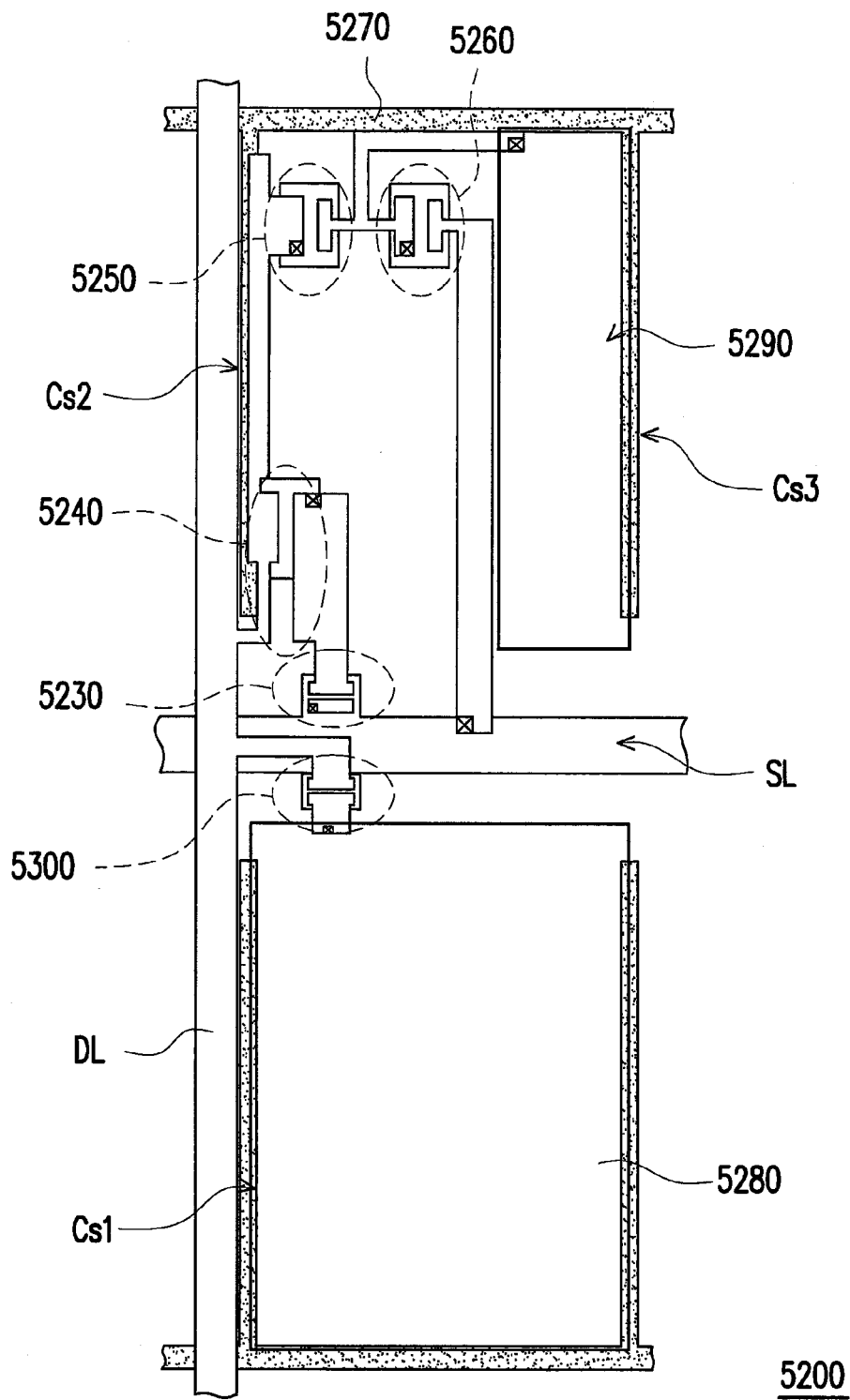
FIG. 8A is a schematic diagram of a single dummy pixel unit in a pixel array substrate according to the fifth embodiment of the present invention.
Figure 8B:
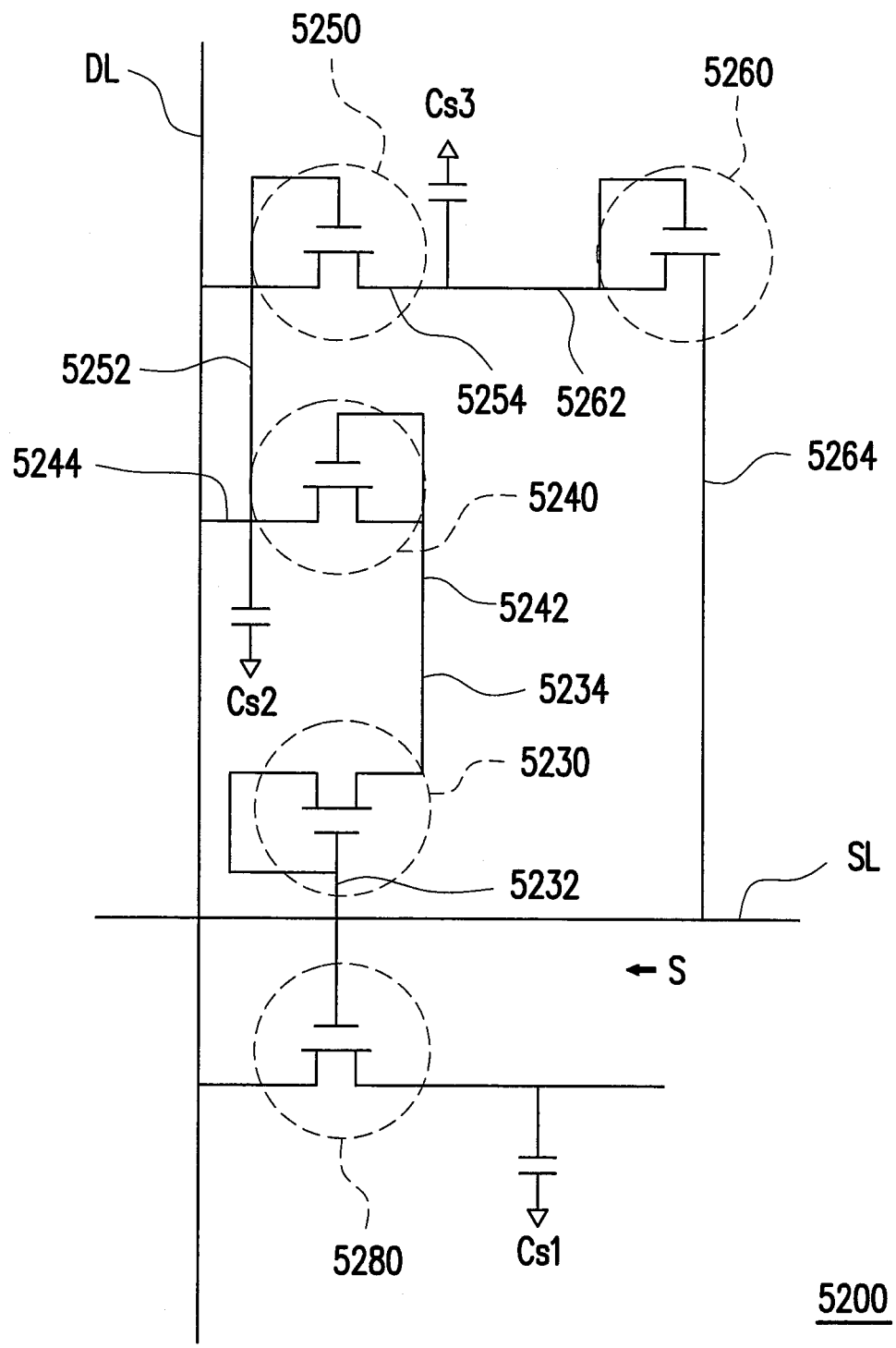
FIG. 8B is a schematic diagram of an equivalent circuit of the single dummy pixel unit in FIG. 8A.

FIG. 8A is a schematic diagram of a single dummy pixel unit in a pixel array substrate according to the fifth embodiment of the present invention. FIG. 8B is a schematic diagram of an equivalent circuit of the single dummy pixel unit in FIG. 8A. Referring to both FIG. 8A and FIG. 8B, each of the dummy pixel units 5200 comprises a data line DL, a scan line SL, a TFT 5300, a first pixel electrode 5280, a first switching element 5230, a second switching element 5240, a third switching element 5250, a fourth switching element 5260 and a second pixel electrode 5290. The TFT 5300 is electrically connected to the data line DL and scan line SL. The TFT 5300 is also electrically connected to the first pixel electrode 5280.

One end 5232 of the first switching element 5230 is electrically connected to the scan line SL, while the other end 5234 of the first switching element 5230 is electrically connected to an end 5242 of the second switching element 5240. The other end 5244 of the second switching element 5240 is electrically connected to the data line DL.

Accordingly, one end 5252 of the third switching element 5250 is electrically connected to the other end 5244 of the second switching element 5240. The other end 5254 of the third switching element 5250 is electrically connected to one end 5262 of the fourth switching element 5260, and the other end 5264 of the fourth switching element 5260 is electrically connected to the scan line SL. In addition, the second pixel electrode 5290 is electrically connected to the third switching element 5250 and the fourth switching element 5260.

Moreover, each of the dummy pixel units 5200 further comprises a first storage capacitor $Cs_1$ electrically connected to the TFT 5300. The first storage capacitor $Cs_1$ is formed by the stacking area of the first pixel electrode 5280 and a common line 5270. Similarly, the first storage capacitor $Cs_1$ may also be formed by a stacking area of the first pixel electrode and the scan line (not shown), as a Cst on gate.

Furthermore, each of the dummy pixel units 5200 further comprises a second storage capacitor $Cs_2$ which is electrically connected to the second switching element 5240 and the third switching element 5250, and a third storage capacitor $Cs_3$ which is electrically connected to the third switching element 5250 and the fourth switching element 5260. The second storage capacitor $Cs_2$ and the third storage capacitor $Cs_3$ are formed by the respective overlapping areas between the common line 5270 and metal line of the second switching element 5240 or the third switching element 5250 and between the common line 5270 and the metal line of the third switching element 5250 or the fourth switching element 5260.

When electrostatic current S is transmitted from the scan line SL, it may be transmitted to the data line DL and be dissipated by turning on the first switching element 5230 and the second switching element 5240. In addition, the electrostatic current S transmitted to the second switching element 5240 may also be transmitted to the scan line SL and be dissipated by turning on the third switching element 5250 and the fourth switching element 5260.

Certainly, the second storage capacitor $Cs_2$ and the third storage capacitor $Cs_3$ may provide extra storage capacity for electrostatic charges, thereby increasing the efficacy of dissipating electrostatic currents.

Additionally, in FIG. 8, the design of the TFT 5300 and the first pixel electrode 5280 located in the lower part of the dummy pixel 5200 is the same as that of the display pixel unit 120a in FIG. 2. This achieves continuity of the electronic characters.

In summary, the dummy pixel unit of the present invention comprises a plurality of switching elements, and the corresponding connections between the switching elements and the data line, scan line and common line form the dummy pixel unit that has the function of electrostatic discharging protection. Therefore by utilizing the dummy pixel unit as such, the purpose of protecting display pixel units in the pixel array substrate from damage caused by electrostatic discharging is fulfilled. In addition, since the dummy pixel unit readily provides electrostatic discharge protection, no additional shorting bars or other ISRs are required to be disposed in the circuit region of the substrate. This decreases the wiring area in the circuit region of the pixel array substrate, therefore reducing the size of the pixel array substrate. Furthermore, under the consideration of not changing the size of the pixel array substrate, since no additional shorting bars or other ISRs are required to be disposed in the circuit region of the substrate, the area for laying circuits in the circuit region on the pixel array substrate is increased. This promotes flexibility of circuit layout in the circuit region.

Although the present invention has been described with reference to the above embodiments, application of the present invention is not limited to these embodiments. It will be apparent to one of ordinary skills in the present art that modifications to the described embodiment may be made without departing from the spirit of the invention. Accordingly, the scope of the invention will be defined by the attached claims and not by the above detailed descriptions.

What is claimed is:

1. A pixel array substrate, having a pixel region and a circuit region adjacent to the pixel region, the pixel array substrate comprising:
   a plurality of display pixel units, disposed in the pixel region; and
   a plurality of dummy pixel units, disposed in the circuit region, each of the dummy pixel units comprising:
      a data line and a scan line;
      a plurality of switching elements, electrically connected to the data line and the scan line; and
      a plurality of pixel electrodes, electrically connected to the switching elements,
      wherein electrostatic currents in the pixel region are dissipated by the dummy pixel units in the circuit region,
      wherein each of the dummy pixel units comprises:
         a common line, disposed parallel to the scan line;
         a first switching element, one end of the first switching element being electrically connected to the data line or the scan line;
         a second switching element, one end of the second switching element being electrically connected to the other end of the first switching element, the other end of the second switching element being electrically connected to the common line;
         a first pixel electrode, electrically connected to the first and the second switching elements;
         a third switching element, one end of the third switching element being electrically connected to the data line;
         a fourth switching element, one end of the fourth switching element being electrically connected to the other end of the third switching element, the other end of the fourth switching element being electrically connected to the common line; and
         a second pixel electrode, electrically connected to the third and the fourth switching elements.

2. The pixel array substrate of claim 1, wherein the first, the second, the third and the fourth switching elements are all diodes.

3. The pixel array substrate of claim 1, wherein the first, the second, the third and the fourth switching elements are all thin film transistors, and a gate of each of the thin film transistors is electrically connected to a source or a drain of the same thin film transistor.

4. The pixel array substrate of claim 1, wherein each of the dummy pixel units further comprises a first storage capacitor and a second storage capacitor, the first storage capacitor being electrically connected to the first and the second switching elements, the second storage capacitor being electrically connected to the third and the fourth switching elements.

* * * * *